June 6, 1950     A. LILLEVICK     2,510,826
VEGETABLE WASHING MACHINE
Filed May 7, 1948     2 Sheets-Sheet 1
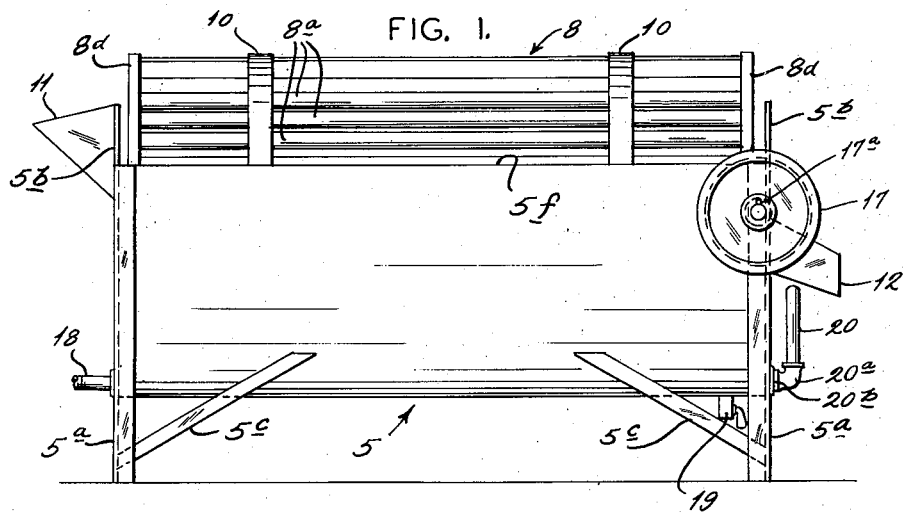
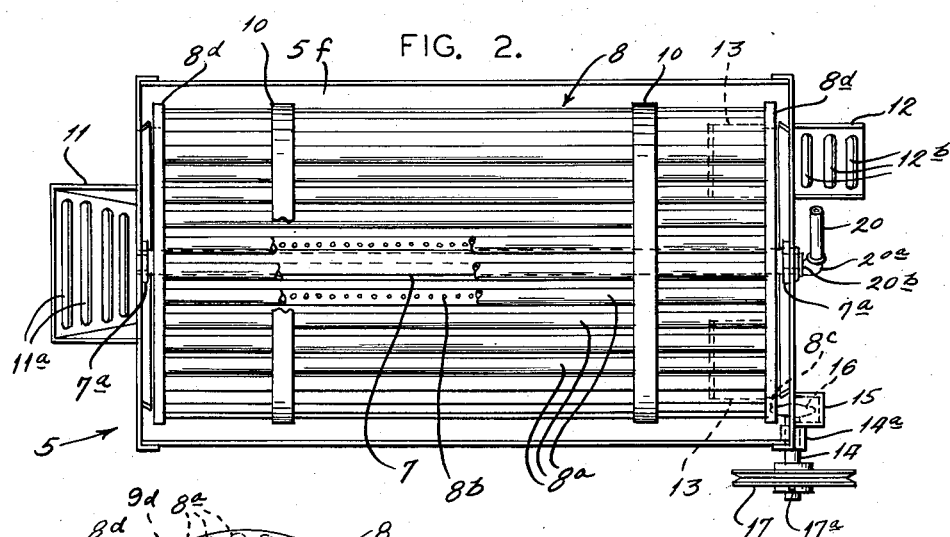
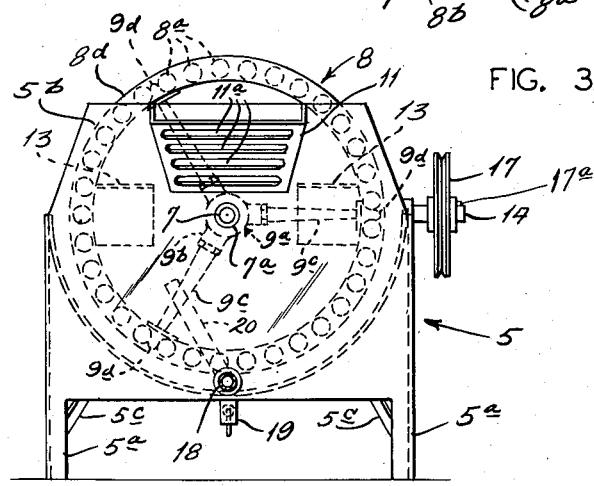
Inventor
Arne Lillevick
By A. L. Fisher,
Attorney June 6, 1950          A. LILLEVICK          2,510,826
VEGETABLE WASHING MACHINE
Filed May 7, 1948          2 Sheets-Sheet 2
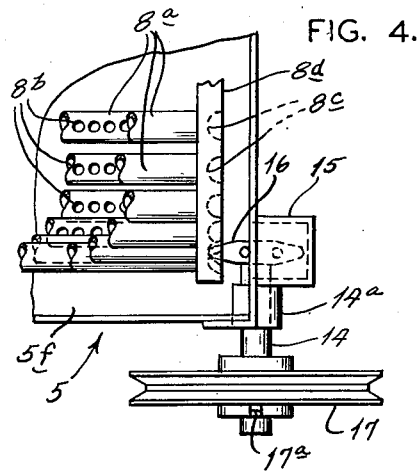
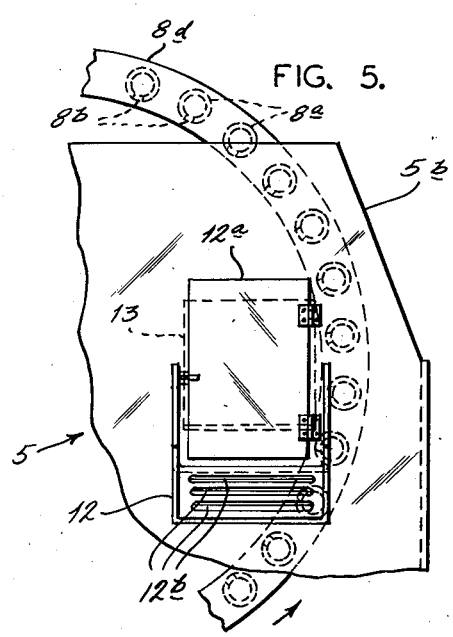
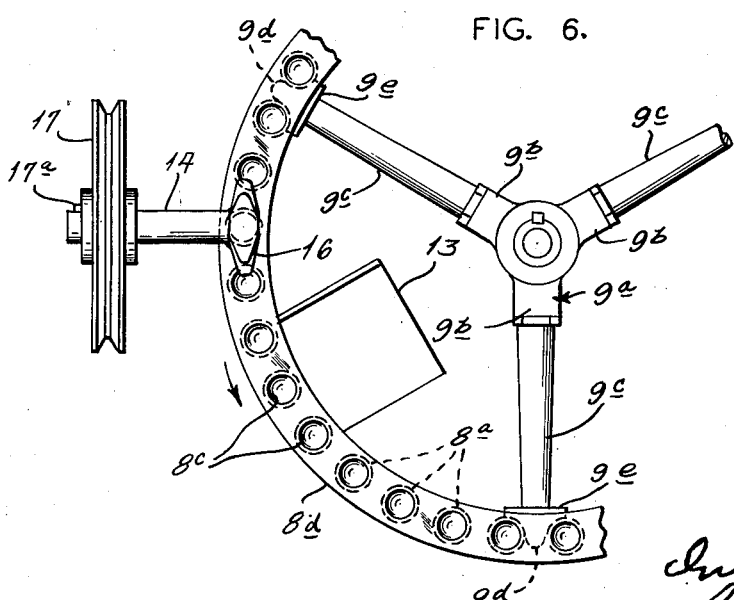
Inventor
Arne Lillevick
By A. E. Fisher,
Attorney Patented June 6, 1950

2,510,826

UNITED STATES PATENT OFFICE 2,510,826

VEGETABLE WASHING MACHINE

Arne Lillevick, Dundas, Ontario, Canada

Application May 7, 1948, Serial No. 25,570

4 Claims. (Cl. 51—164)

This invention relates to machines for washing vegetables in loose bulk form, such as carrots, parsnips, turnips, beets, potatoes, or the like. The machine might also be used for polishing onions, and for other purposes.

Stated generally, the object of the invention is to provide a vegetable washing machine of the kind referred to, the same including a semi-cylindrical water tank suitably mounted and supported on end plates, an agitator and shower drum rotatably journaled endwise through the water-tank, said drum being of tubular construction and the tubes thereof being perforated to permit water to enter therein as the rotating drum passes downward through the water of the tank, and to spray and shower water therefrom as the rotating drum again elevates them, means for running water through the tank, means for feeding vegetables into the tubular drum, separate means for discharging the vegetables from the drum after they are washed, and means for rotating the drum.

Stated more particularly, the object of the invention is to provide in a relatively simple and practicable form, a machine of the kind referred to, the same including an elongated, semi-cylindrical water-tank supported upon legs as depended from end plates, the said tank being constructed of metal or other suitable material, an axle-shaft extended along through the water-tank in concentric alignment therewith, and journaled at its ends in the said end-plates, a cylindrical agitator drum or frame supported rigidly and concentrically upon the said axle-shaft to rotate therewith, the said drum being formed of a plurality of tubes extended longitudinally of the tank and supported at their ends in close and parallel but open and equi-spaced relation, between end rings rigidly and concentrically encircling the ends of the axle-shaft, within the said water-tank, the said tubes being closed at their ends but perforated along their inner sides, a receiving chute slopingly mounted through one end of the outer housing and leading into the water-tank and agitator drum, a sloping discharge chute leading from the opposite end of the agitator drum and water-tank and extended out through the end plate, the same being located above the bottom and at one side of the said drum and tank, a door in the end plate for closing the discharge chute, means for diverting vegetables into the discharge chute as they pass through the machine from the receiving chute, means for running water into the water-tank and discharging same therefrom, and means for rotating the agitator drum.

With the stated objects in view, together with such additional objects and advantages as may appear from the specification, attention is now directed to the accompanying drawing as illustrating a preferred form of the machine, and wherein Figure 1 is a side elevational view of the washing machine.

Figure 2 is a top plan view of the machine.

Figure 3 is a frontal end view of the machine.

Figure 4 is a fragmentary detail view in plan and on an enlarged scale, showing the construction and arrangement of the power unit mounted at the rear end of the machine for operating the machine.

Figure 5 is a similar fragmental detail view of the rear end of the machine, showing the discharge chute and door, and a section of the tube supporting or drum ring.

Figure 6 is a similar fragmental detail view, in elevation, showing the construction and arrangement of the power unit for operating the machine.

In its preferred form of construction as shown in the drawings, the vegetable washing machine comprises a suitable elongated, semi-circular water-tank shown generally at 5, supported upon legs 5a depended from end plates 5b and braced as at 5c. The tank is left open at its upper side as at 5f. The tank 5 is indicated in broken lines in Figure 6, the open side 5f of this tank being turned upwardly. The tank 5 is suitably welded or otherwise rigidly seated between the end plates 5b. An axle-shaft 7 is extended longitudinally through the water-tank 5 in concentric relation with the semi-cylindrical walls of the tank, said shaft being journaled at its ends through the end plates 5b of the tank, as indicated at 7a in Figures 2 and 3.

An open ended agitator and shower drum 8 of cylindrical formation and tubular construction is mounted rigidly and concentrically upon the axle-shaft 7 to rotate therewith. This drum comprises a plurality of tubes 8a apertured as at 8b length-wise along their inner sides facing the axle-shaft 7. These tubes 8a are closed at their ends and are seated thereat in close and parallel but open and semi-spaced relation in end rings 8b which encircle the ends of the axle-shaft 7, within the tank 5. This tubular and apertured cylindrical drum unit is supported in concentric relation with the axle-shaft 7, by means of spiders 9 (Figure 6) which include the hubs 9a rigidly keyed upon the axle-shaft 7 in substantial spaced relation from the ends thereof, so as not to interfere with the operation of the machine and in particular with the discharge of vegetables therefrom after they are washed. These hubs include as here shown three angularly spaced spoke socket members 9b, equally spaced apart and which are bored and tapped axially to engage the inner and complementally threaded ends of spokes 9c which extend radially out to the tubes 8a and are tapered thereat to engage thimbles 9d adapted to pass between pairs of adjacent tubes, as indicated in Figure 6. The thimbles 9d spread laterally as at 9e immediately back of the tapered outer extremities thereof, for laterally abutting the tubes 8a and preventing the spokes from penetrating too far between the tubes. A pair of lock-rings or hoops 10 are finally mounted outwardly over the ends of the tubular drum 8 immediately over the spokes 9c and are contracted and drawn down to place thereon, for firmly locking the drum and spiders together.

A vegetable feed chute 11 is anchored by welding or otherwise centrally to the upper margin of the front end plate 5b, and this chute opens downwardly and inwardly through the front end plate 5b into the cylindrical and tubular drum 8, the bottom of the chute being sloped down as shown and being pierced through with a series of transversely elongated slots 11a for permitting dirt and particles of other foreign matter to fall therethrough. A vegetable discharge chute 12 is similarly anchored upon and extended through the rear end plate 5b, the outer end thereof being sloped downwardly as shown for discharging vegetables from the machine after they are washed. This chute 12 is located upwardly at one side of the end of the tank, and angularly above the bottom thereof about ninety degrees, and opens into the drum 8 through a hinged and latched door 12a. The bottom of this chute is also transversely slotted as at 12b, to permit foreign matter to fall therethrough, as vegetables pass downwardly through the chute from the drum 8 in manner later explained. A pair of vegetable ejector paddles 13 are mounted angularly and diametrically oppositely within the rear or discharge end of the drum 8, these paddles being anchored to the tubes 8 by welding or otherwise. The paddles 13 extend diametrically inward but the planes of the paddles are turned, slanted or sloped angularly in a longitudinal direction, in such manner that as the drum 8 rotates in a counter-clockwise direction (looking towards the rear end of the machine, or as indicated by the arrows in Figures 5 and 6) the paddles will alternately scoop up a portion of the vegetables from the bottom of the drum and raise and discharge them through the door 12a (when this door is open) and into the chute 12. In other words, the slant or slope of the paddles as they rise into alignment with the discharge chute corresponds with and forms a continuation of the slant or slope of the chute, for the purpose of picking up and discharging vegetables as washed and passed through the machine.

For rotating the drum 8, a pinion shaft 14 is journaled laterally as at 14a into a small housing 15 upwardly extended from the rear end plate 5b, and a small five-toothed pinion sprocket wheel or cog-wheel 16 (Figures 4, 6) is keyed upon the inner end of the shaft 14, within the housing 15, and the teeth of the cog-wheel are arranged to intermesh with and traverse a series of holes 8c (Figure 6) formed in equi-spaced relation through the rear end ring 8b of the drum 8. A pulley wheel 17 is rigidly keyed as at 17a upon the outer end of the shaft 14, for engaging a power transmission belt (not shown) as extended from a motor (not shown) for operating the machine. A water inlet cock 18 is mounted through the lower side of the frontal end plate 5b and leads into the water tank 5, and to which a hose may be connected for running water into the tank. A drain plug 19 is mounted through the bottom of the opposite rear end of the water tank. A water level control pipe 20 (Figures 1 and 2) is extended laterally from the outer stem of a pipe elbow 20a, the other stem thereof being journaled horizontally through the base of the rear end plate 5b of the tank 5, as indicated at 20b, and leads into the water tank 5. By these arrangements water may be fed into the water tank, or drained therefrom as desired, and the height of the water within the tank may be regulated by raising or lowering the pipe 20. When the water in the tank attains a height equal to the elevation of the outer end of the pipe 20, any additional water entering the tank will flow out through the pipe 20. Thus water may be kept constantly flowing through the tank if so desired.

In the operation and use of the machine as described, the chute door 12a is first closed, water is then filled into the water tank 5 to the required level in the manner pointed out. The power being then turned on for rotating the drum 8 in the required direction, vegetables to be washed are fed through the chute 11 into the open front end of the drum 8. The tubular and apertured drum rotates and tumbles the vegetables about and at the same time the apertured tubes of the drum fill with water while passing down through the water tank, and on rising again they shower this water down upon the tumbling vegetables, thus thoroughly washing and cleaning them as they pass rearward through the machine towards the discharge chute 12. When the vegetables reach the rear end of the machine and after they have been sufficiently tumbled and showered, the chute door 12a is opened, and the paddles 13 then pick up the vegetables in successive small quantities and elevate them into alignment with the chute 12, into which chute they slide by gravity and fall into a receptacle placed below the chute for receiving them. In the upward travel of the vegetables as carried on the paddles 13, they are retained on the paddles until they reach the discharge chute 12, by the rear end plate 5b of the housing 5. If desired, the front end of the machine may be raised a little relative to the rear end, this inclination, through the operation of gravity, serving to expedite the travel of the vegetables through the machine.

While I have here shown and described a preferred form and embodiment of the machine, and specific structural features thereof, the described construction may be changed and modified as desired, within the scope of the claims.

I claim:

1. A machine of the kind referred to, the same including an elongated, semi-cylindrical tank supported upon end plates and legs, and with its open side turned upwardly, an axle-shaft extended along through the water-tank in concentric alignment therewith, and journaled at its ends in the said end-plates, a cylindrical agitator drum or frame supported rigidly and concentrically upon the said axle-shaft to rotate therewith, the said drum being formed of a plurality of tubes extended longitudinally of the tank and supported at their ends in close and parallel but open and equi-spaced relation between end rings rigidly and concentrically encircling the ends of the axle-shaft, within the said water tank, the said tubes being closed at their ends but perforated along their inner sides, a receiving chute slopingly mounted through one end plate and leading into the water-tank and agitator drum, a sloping discharge chute leading from the opposite end plate of the water-tank, the same being located above the bottom and at one side of the said drum and tank, a door for closing the discharge chute, means for diverting vegetables into the discharge chute as they pass through the machine from the receiving chute, means for running water into the water-tank and discharging same therefrom, and means for rotating the agitator drum.

2. In a machine according to claim 1, the said means for diverting the vegetables into the discharge chute comprising ejector paddles mounted within and upon the rear end of the agitator drum close to the end of the housing and angularly positioned and slanted thereon for picking up vegetables as they move to the rear end of the drum and raise them with the rotating drum into alignment with the discharge chute for gravitational passage down and out through the chute when the chute door is open.

3. In a machine according to claim 1, the said means for rotating the agitator drum comprising a pinion shaft journaled upwardly upon the rear end plate of the tank and extended laterally and horizontally to one side thereof, a pinion sprocket wheel keyed upon the inner end of the pinion shaft and placed in mesh with the series of holes formed in equi-spaced relation through the rear end ring of the agitator drum, and a pulley wheel keyed upon the outer end of the pinion shaft for receiving power through a transmission belt.

4. In a machine according to claim 1, the said receiving and discharge chutes at the ends of the housing being slotted for permitting dirt and particles of matter to fall therethrough.

ARNE LILLEVICK.

REFERENCES CITED

The following references are of record in the file of this patent:

UNITED STATES PATENTS

| Number | Name | Date |
| --- | --- | --- |
| 1,648,823 | Randall et al. | Nov. 8, 1927 |
| 1,806,957 | Stocking | May 26, 1931 |
| 1,824,814 | Frine | Sept. 29, 1931 |